US011425147B2

(12) United States Patent
Raj et al.

(10) Patent No.: US 11,425,147 B2
(45) Date of Patent: Aug. 23, 2022

(54) IN-SERVICE DATA PLANE ENCRYPTION VERIFICATION

(71) Applicants: Oracle International Corporation, Redwood Shores, CA (US); Infinera Corporation, Sunnyvale, CA (US)

(72) Inventors: Kannan Raj, San Diego, CA (US); Jagwinder Singh Brar, Bellevue, WA (US); Abhinava Sadasivarao, San Ramon, CA (US); Radhakrishna Valiveti, Union City, CA (US); Sharfuddin Syed, San Jose, CA (US); Loukas Paraschis, Menlo Park, CA (US)

(73) Assignees: Oracle International Corporation, Redwood Shores, CA (US); Infinera Corporation, Sunnyvale, CA (US)

( * ) Notice: Subject to any disclaimer, the term of this patent is extended or adjusted under 35 U.S.C. 154(b) by 153 days.

(21) Appl. No.: 16/796,733

(22) Filed: Feb. 20, 2020

(65) Prior Publication Data
US 2020/0280566 A1    Sep. 3, 2020

Related U.S. Application Data

(60) Provisional application No. 62/812,902, filed on Mar. 1, 2019.

(51) Int. Cl.
*H04L 9/40* (2022.01)
*G06F 21/60* (2013.01)
(52) U.S. Cl.
CPC .......... *H04L 63/126* (2013.01); *G06F 21/602* (2013.01); *H04L 63/0457* (2013.01); *H04L 63/0471* (2013.01)

(58) Field of Classification Search
CPC .......... G06F 21/00; G06F 15/16; G06F 21/60; G06F 9/00; G06F 21/602; H04L 1/00;
(Continued)

(56) References Cited

U.S. PATENT DOCUMENTS 6,697,943 B1 * 2/2004 Frantz .................. H04L 1/0017
713/160
8,510,549 B2 * 8/2013 Rossi .................. H04L 63/0428
713/151

(Continued)

OTHER PUBLICATIONS

"802.1AE-2006—MAC Security (MACsec)", IEEE Standard for Local and metropolitan area networks—Media Access Control (MAC) Security, retrieved from: https://1.ieee802.org/security/802-1ae/, on Mar. 11, 2020, 5 pages.

(Continued)

*Primary Examiner* — Thanhnga B Truong
(74) *Attorney, Agent, or Firm* — Kilpatrick Townsend & Stockton LLP

(57) ABSTRACT

A method of executing in-session encryption verification includes receiving a plurality of client data packets for transmission through a network; receiving one or more test data packets for verifying an encryption device; merging the client data packets and the one or more test packets into a data stream; selecting security parameters for each packet in the data stream based on a corresponding packet type; encrypting each packet in the data stream using the encryption device and the corresponding security parameters; and transmitting the data stream comprising encrypted packets through the network. The method also includes decrypting the encrypted packets at a receiving system using congruent techniques.

20 Claims, 12 Drawing Sheets

(58) Field of Classification Search
CPC ....... H04L 29/06; H04L 9/00; H04L 63/0457; H04L 63/0471; H04L 63/126
See application file for complete search history.

(56) References Cited

U.S. PATENT DOCUMENTS

| | | | |
|---|---|---|---|
| 8,976,792 B2* | 3/2015 | Patel | H04L 45/64 370/392 |
| 2003/0097495 A1* | 5/2003 | Hansen | G06K 15/1848 710/8 |
| 2005/0049976 A1* | 3/2005 | Yang | G06F 21/123 705/67 |
| 2016/0036813 A1* | 2/2016 | Wakumoto | H04L 63/0272 713/171 |

OTHER PUBLICATIONS

"802.1AEbn-2011—MAC Security (MACsec)—GCM-AES-256 Cipher Suite", retrieved from: https://1.ieee802.org/security/802-1aebn/, on Mar. 11, 2020, 4 pages.

"802.1AEbw-2013—MAC Security (MACsec)—Extended Packet Numbering", retrieved from: https://1.ieee802.org/security/802-1aebw/, on Mar. 11, 2020, 4 pages.

\* cited by examiner

IN-SERVICE DATA PLANE ENCRYPTION VERIFICATION

CROSS-REFERENCES TO RELATED APPLICATIONS

This application claims the benefit of U.S. Provisional Application No. 62/812,902, titled IN-SERVICE DATA PLANE ENCRYPTION VERIFICATION, filed on Mar. 1, 2019, which is incorporated herein by reference.

BACKGROUND

Cloud infrastrutures may include data center interconnect solutions that enable clients to connect data centers together in the cloud in a scalable, reliable, and secure fashion. Many interconnect solutions may include dedicated ASIC hardware that includes encryption blocks for providing end-to-end encryption of data passing between data centers through the cloud. However, this encryption hardware is typically only tested prior to the creation of the encrypted service. This pre-service testing may include known-answer tests (KATs) that provide software-configured parameters (e.g., NONCE, SALT, KEY, Plaintext, etc.), then compare the resulting output from the encryption hardware to known-answer results. Some encryption hardware may also include on-chip self-tests with hardcoded parameters. However, none of these pre-service testing methods have the ability to test the encryption hardware during service in an active data plane. Therefore, problems arising after the initial testing of the encryption hardware may go unnoticed and compromise the encryption and/or data integrity of client data.

BRIEF SUMMARY

In some embodiments, a method of executing in-session encryption verification may include receiving a plurality of client data packets for transmission through a network; receiving one or more test data packets for verifying an encryption device; merging the client data packets and the one or more test packets into a data stream; selecting security parameters for each packet in the data stream based on a corresponding packet type; encrypting each packet in the data stream using the encryption device and the corresponding security parameters; and transmitting the data stream comprising encrypted packets through the network.

In some embodiments, a system may include one or more inputs configured to receive a plurality of client data packets; receive one or more test data packets; and merge the client data packets and the one or more test packets into a data stream. The system may also include a packet classification stage configured to select security parameters for each packet in the data stream based on a corresponding packet type. The system may additionally include an encryption device configured to encrypt each packet in the data stream using the encryption device and the corresponding security parameters. The system may further include an output configured to transmit the data stream comprising encrypted packets through the network.

In some embodiments, a non-transitory, computer-readable medium may include instructions that, when executed by one or more processors, cause the one or more processors to perform operations including receiving a plurality of client data packets for transmission through a network; receiving one or more test data packets for verifying an encryption device; merging the client data packets and the one or more test packets into a data stream; selecting security parameters for each packet in the data stream based on a corresponding packet type; encrypting each packet in the data stream using the encryption device and the corresponding security parameters; and transmitting the data stream comprising encrypted packets through the network.

In any embodiments, any or all of the following features may be implemented in any combination and without limitation. The method/operations may also include receiving the data stream comprising the encrypted packets; identifying a type for each of the encrypted packets based on a field in a security tag of each of the encrypted packets; selecting the security parameters for each of the encrypted packets based on the field; decrypting each of the encrypted packets; and verifying whether the encryption device functioned properly. The method/operations may also include providing, to a user, an indication of whether the encryption device functioned properly. The method/operations may also include receiving a trigger signal to initiate the encryption verification. The trigger signal may be generated by a policy engine. The trigger signal may be generated by a network controller. The trigger signal may be generated by a machine learning engine. The trigger signal may be generated periodically automatically. The plurality of client data packets may be are sequenced differently than the one or more test data packets. The method/operations may also include determining the packet type using information in a header of the packet and a classification table. The method/operations may also include selecting the security parameters from a lookup table. The output of the system may include a DSP and a PIC. The system may include a DCI transport system. The system may also include a control channel configured to securely transmit encryption keys between DCI transport systems in a cloud transport network, where the control channel may be separate and distinct from a channel through which the encrypted packets are transmitted through the network. The system may also include second one or more inputs configured to receive the data stream comprising the encrypted packets; a second packet classification stage configured to identify a type for each of the encrypted packets based on a field in a security tag of each of the encrypted packets and select the security parameters for each of the encrypted packets based on the field; a second encryption device configured to decrypt each of the encrypted packets; and a processor configured to verify whether the encryption device functioned properly. The first encryption device and the second encryption device may be part of a same DCI transport system. Identifying a type for each of the encrypted packets m accessing an AN field in a MACsec frame around an encrypted payload.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for in-service testing of encryption systems during runtime. This testing can take place using test data that is injected together with client data without causing a significant reduction in bandwidth or throughput. These embodiments also maintain the privacy and integrity of customer data, which is also part of the same data stream. Various methods may be used to inject test data into the transmitted data stream periodically based on various triggering mechanisms. The system may also verify that the encryption/decryption process was handled correctly at any data flow endpoints.

Figure 1:
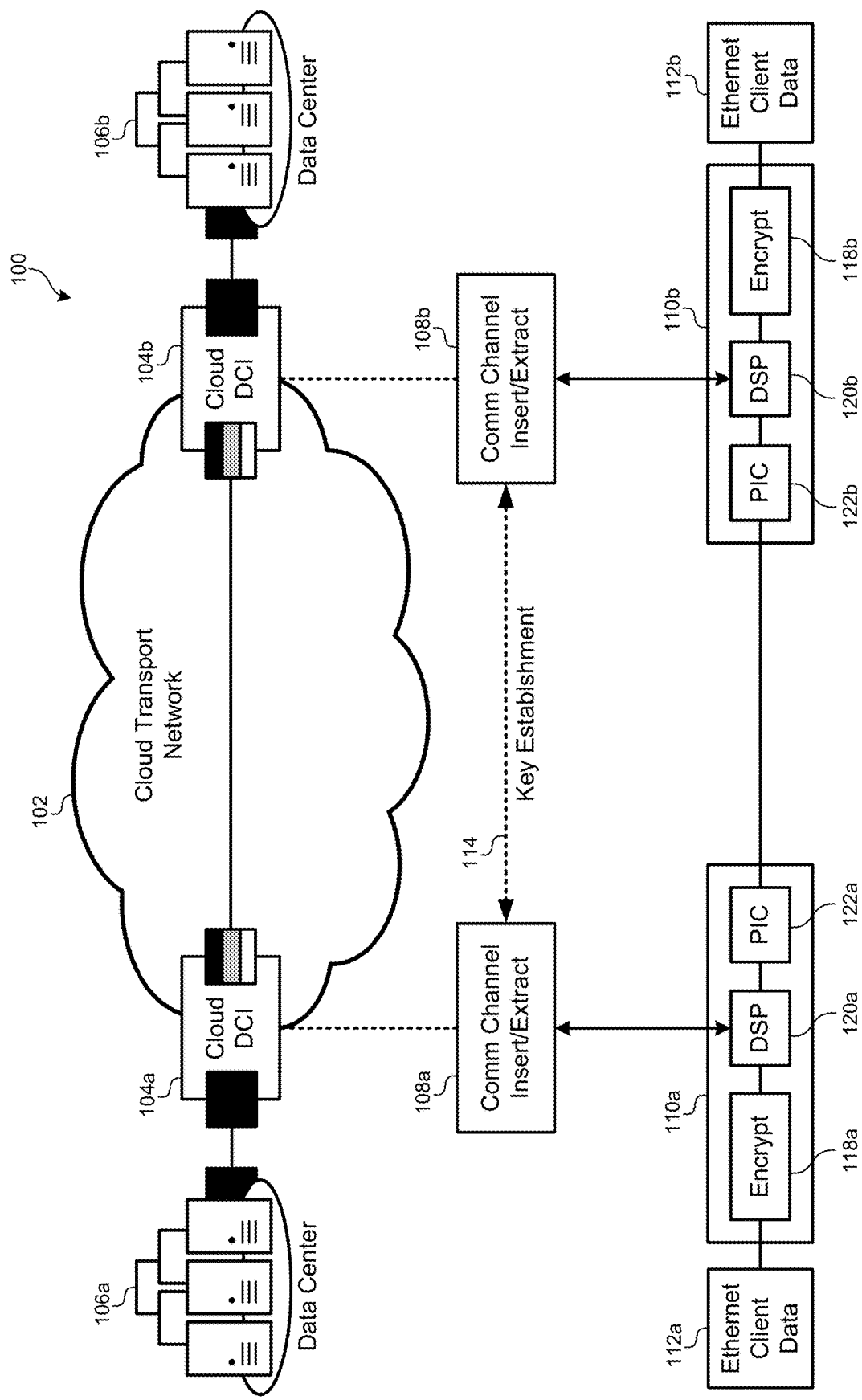
FIG. 1 illustrates a cloud platform data path for providing in-service encryption verification, according to some embodiments.

FIG. 1 illustrates a cloud platform 100 data path for providing in-service encryption verification, according to some embodiments. The cloud platform 100 may include a cloud transport network 102 that includes a plurality of cloud data center interconnect (DCI) transport systems 104 that can be used to couple data from a plurality of data centers 106 together in the cloud transport network 102. In order to provide end-to-end encryption services as data is passed through the cloud transport network 102, secret encryption keys can be shared between the plurality of cloud DCI transport systems 104 through a control channel 114. Modules 108 connected through the control channel 114 can exchange or synchronize secret keys that can be used to encrypt/decrypt data as it is passed between the plurality of cloud DCI transport systems 104. Alternatively, messages may be exchanged to permit keys to be independently derived at the modules 108 such that the encryption keys themselves do not need to be distributed or passed through the control channel 114 or the cloud transport network 102.

In some embodiments, the control channel 114 may include a General Communication Channel (GCC) as an in-band side channel used to carry transmission management and signaling information within optical transport network elements. However, any separate communication channel may be used, and the GCC is only one example of many different options. Some embodiments may also include a CPU connected to the control channel 114 to produce/consume the keys related to the encryption methods described herein. For example, modules 108 may include an interface to the control channel 114, along with a CPU and a data store for managing various encryption keys. This may include a Key Management Service (KMS) configured to securely create, manage, rotate, and distribute encryption keys. Separating the communication channel from the direct communication of the cloud DCI transport systems 104 through the cloud transport network 102 allows any data traveling through the cloud transport network 102 may be encrypted and secure, while the encryption process can be entirely transparent to the data centers 106. For example, the cloud transport network 102 may include a plurality of point-to-point units such as the Infinera Cloud Xpress® DCI transport system.

Various encryption protocols may be implemented by the DCI transport systems 104. For example, some embodiments may use the MACsec standard IEEE 102.1AE-2006 in which packets flow over secure channels supported by secure associations. Randomly generated keys may be passed between end points using, for example, the control channel 114. In some embodiments, the control channel 114 may use the MACsec Key Agreement protocol (IEEE 802.1x), or any other protocol that provides for key exchange and mutual authorization of associated nodes. MACsec is particularly well adapted to secure a standard LAN or Ethernet connection, as well as other tunneling technologies, such as GENEVE and GRETAP. In the cloud environment, MACsec can be used to encrypt all internal traffic between the data centers 106, preventing the provider of the cloud transport network 102 from having access to the communication between the data centers 106. Note that in some embodiments, the DCI transport systems 104 may belong to the cloud platform 100 and if meant encryption protocols as provided by the customer.

Note that the use of a cloud environment, the Cloud Xpress® hardware, the MACsec protocol, and any other software/hardware depicted or described in relation to FIG. 1 are discussed only by way of example and are not meant to be limiting. In some embodiments, other local network connections may be used in the place of, or in addition to the cloud transport network 102. Additionally, while the MACsec protocol operates at the data link layer, other protocols may be used. For example, the IPsec protocol may be used at the network layer, or the SSL/TLS protocol may be used at the application layer. Although the MACsec protocol and cloud transport network 102 are used throughout this disclosure, the techniques described herein can also be applied to any of these other computing environments and/or protocols.

Continuing with the example of the MACsec protocol, a transmitting DCI transport system 104a may include hardware/software 110a that encrypts client data and prepares and transmits packets or frames through the cloud transport network 102. Client data 112a can be provided to the hardware/software 110a and encrypted by encryption hardware 118a, such as an ASIC. After the client data has been encrypted, a DSP 120a and PIC 122a can handle the transmission of individual packets or frames through the cloud transport network 102. At the receiving end, a receiving DCI transport system 104b may include similar hardware/software 110b that includes a DSP 120b and PIC 122b to handle receiving individual packets or frames from the cloud transport network 102, along with an encryption module 118b that decrypts the encrypted packets or frames and passes the decrypted information on as decoded client data 112b. Note that the encryption hardware 118a that encrypts the data packets and the encryption hardware 118b that decrypts the data packets may be identical, such that Encrypt(A)→Decrypt(Z) and Decrypt(A)←Encrypt(Z). Thus, the hardware may be generically referred to as "encryption hardware," while the function may be separately referred to as encryption and decryption.

Figure 2:
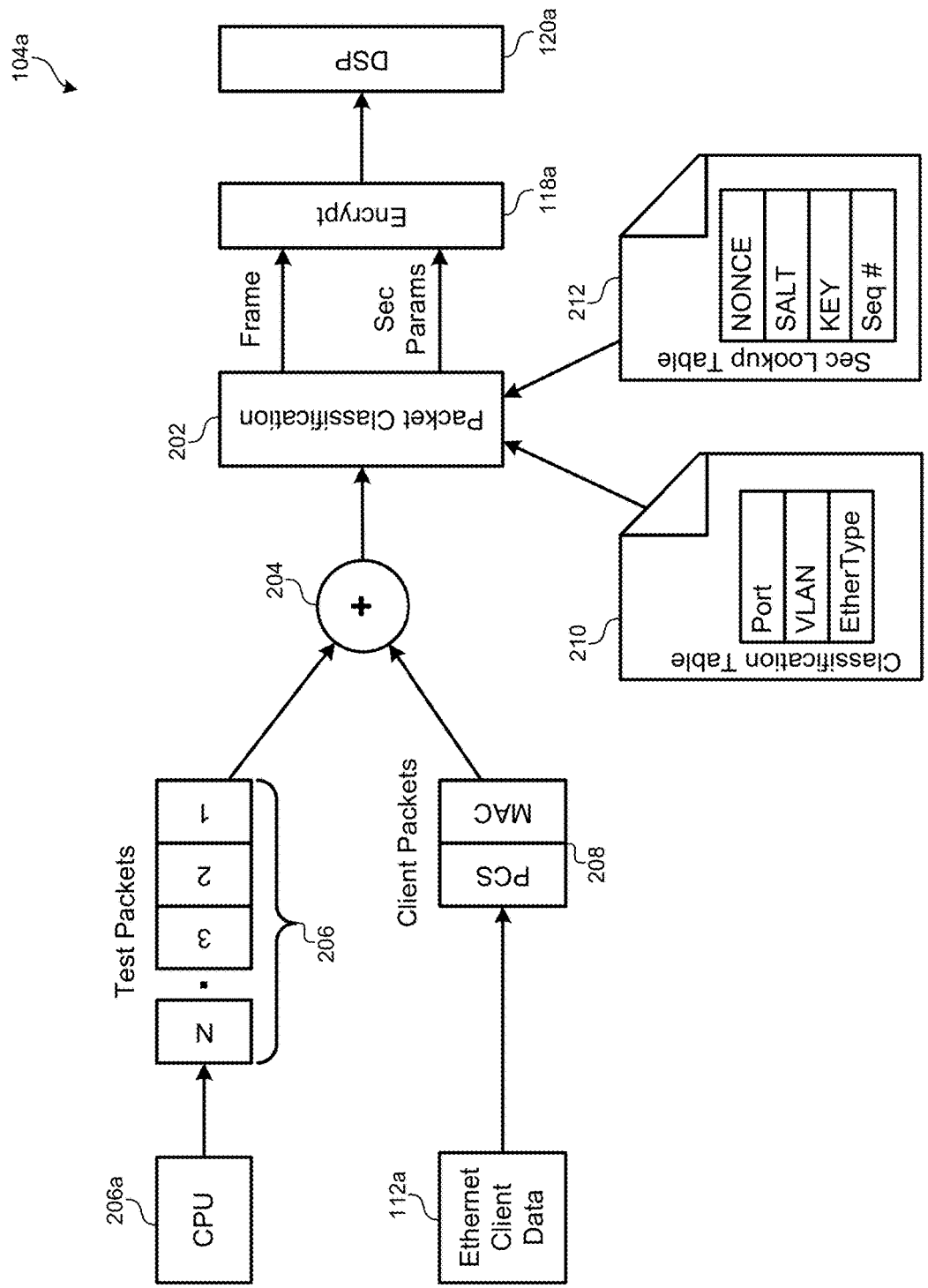
FIG. 2 illustrates a block diagram of a transmitting DCI system with encryption verification, according to some embodiments.

FIG. 2 illustrates a diagram of a transmitting DCI transport system 104a with encryption verification, according to some embodiments. As described above, the DCI transport system 104a may include a source for client data 112a that may represent data from any data source, including a client data center 106a. According to standard techniques, the client data 112a can be passed as individual client packets 208 for transmission across a network connection. Generally, the client data 112a may be sourced by the client and may include an expectation of privacy such that it should be encrypted before transmission, as well as an expectation of data integrity such that any self-testing performed by the system will not interfere with the transmission of the client data 112a (even though data integrity may be affected for other reasons).

To perform the encryption self-test, a CPU 206a can provide a plurality of test packets 206 that can be injected into the stream along with the client packets 208. These test packets 206 may be generated by any data source, and the CPU 206a may include a microcontroller, a microprocessor, a server, and so forth. The CPU 206a may also be an integrated part of the cloud transport network 102 or may alternatively be remotely situated such that it can transmit the test packets 206 to the cloud transport network 102 for testing. The plurality of test packets 206 may be numbered with individual sequence numbers that are separate and distinct from sequence numbers provided for the client packets 208.

As test packets 206 and client packets 208 are received through one or more inputs, they can be merged by a merge function 204 such that they are combined together in the data stream. Note that data within individual client packets 208 need not ever be mixed with data from the test packets 206. Instead, test packets 206 can be interleaved between client packets 208 such that the integrity of the client packets 208 is always maintained. Various methods may be used to adjust the timing by which the test packets 206 are inserted into the data stream to minimize the impact on the bandwidth and throughput of the client packets 208. For example, some embodiments may use a weighted round-robin algorithm to insert test packets 206 with the client packets 208. Some embodiments may monitor network traffic of the client packets 208 and only inject test packets 206 when the traffic of the client packets 208 falls below a threshold. Some embodiments may use a fixed or variable ratio of client packets 208 to test packets 206 to determine when test packets 206 can be injected in the data stream. Note that determining the timing of injecting readied test packets 206 into the data stream is distinct from a trigger event/signal (described below) that may indicate that an encryption verification session should begin.

Once the data stream has been merged by the merge function 204, test packets 206 will be interleaved between varying numbers of client packets 208. Next, some embodiments may encrypt the test packets using security parameters that are different from security parameters used to encrypt the client packets 208. For example, a client may specify a particular set of security parameters that should be used to encrypt their data. To provide flexibility, the system can use an alternate set of security parameters to encrypt the test packets 206. While using the client security parameters for the test packets 206 may be an option for the system, it can also use other predetermined security parameter sets meant for testing test packets 206.

In order to apply different security parameters, the system may include a packet classification stage 202 in the data path that examines at least a portion of each data packet and retrieves a set of security parameters that should be used to encrypt each respective packet. For example, some embodiments may use a classification table 210 that compares attributes read from each packet to classify the packet as one of the client packets 208 or one of the test packets 206. This classification process may examine a port number from which the packet is received, a VLAN or group of devices from which the packet is received, and Ethernet type of the packet, and/or any other information that can be encoded in the packet or the header of the packet to identify the packet as either one of the client packets 208 or one of the test packets 206.

After the packet classification stage 202 identifies a type for the packet, the packet classification stage 202 can access a security lookup table 212 to retrieve a set of security parameters that may be used to encrypt that particular packet. Based on the type retrieved from the classification table 210, the packet classification stage 202 can retrieve security parameters that are keyed by the packet type, such as a NONCE value, a SALT value, an encryption KEY value, a sequence number, and so forth. Because each packet type has its own sequence number, the test packets 206 can be sequenced independently from the client packets 208.

After retrieving the security parameters from the security lookup table 212, the packet classification stage 202 can pass the frame along with the retrieved security parameters to the encryption hardware 118a. The encryption hardware 118a can then use the retrieved security parameters to encrypt the frame and pass the encrypted frame to the DSP 120a and the remainder of the DCI transport system 104a hardware where the encrypted frame can then be transmitted across the cloud transport network securely.

Figure 3:
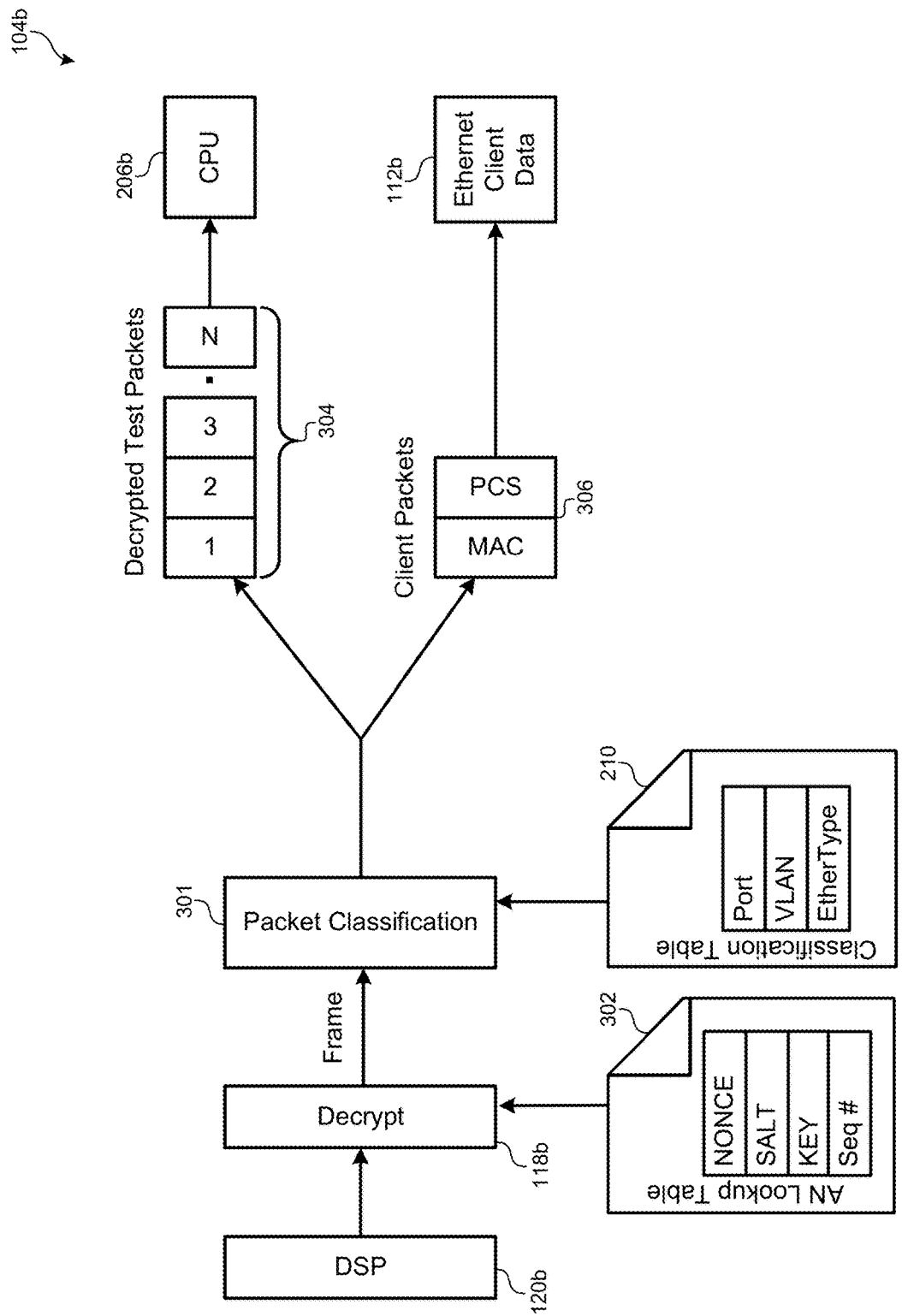
FIG. 3 illustrates a diagram of a receiving DCI system with encryption verification, according to some embodiments.

FIG. 3 illustrates a diagram of a receiving DCI transport system 104b with decryption verification, according to some embodiments. The data path illustrated by FIG. 3 can be considered a mirror of the data path illustrated by FIG. 2. Encrypted frames can be received through the DSP 120b and passed to the encryption hardware 118b to be decrypted. Before decryption can occur, the encryption hardware 118b may need to look up the correct security parameters that were used to encrypt the frame by the transmitting DCI transport system 104a. This lookup can be done by virtue of a specific field in the encrypted frame. For example, when using the MACsec security protocol, the AN field of the encrypted frame can be used to specify whether the encrypted frame was derived from one of the client packets 208 or one of the test packets 206. Alternatively, the AN may be used to simply retrieve the security parameters without necessarily specifying whether the packets were test packets or client packets. In this case, the classification of the packet as a test packet or client packet can be made later in the data stream.

Figure 4:
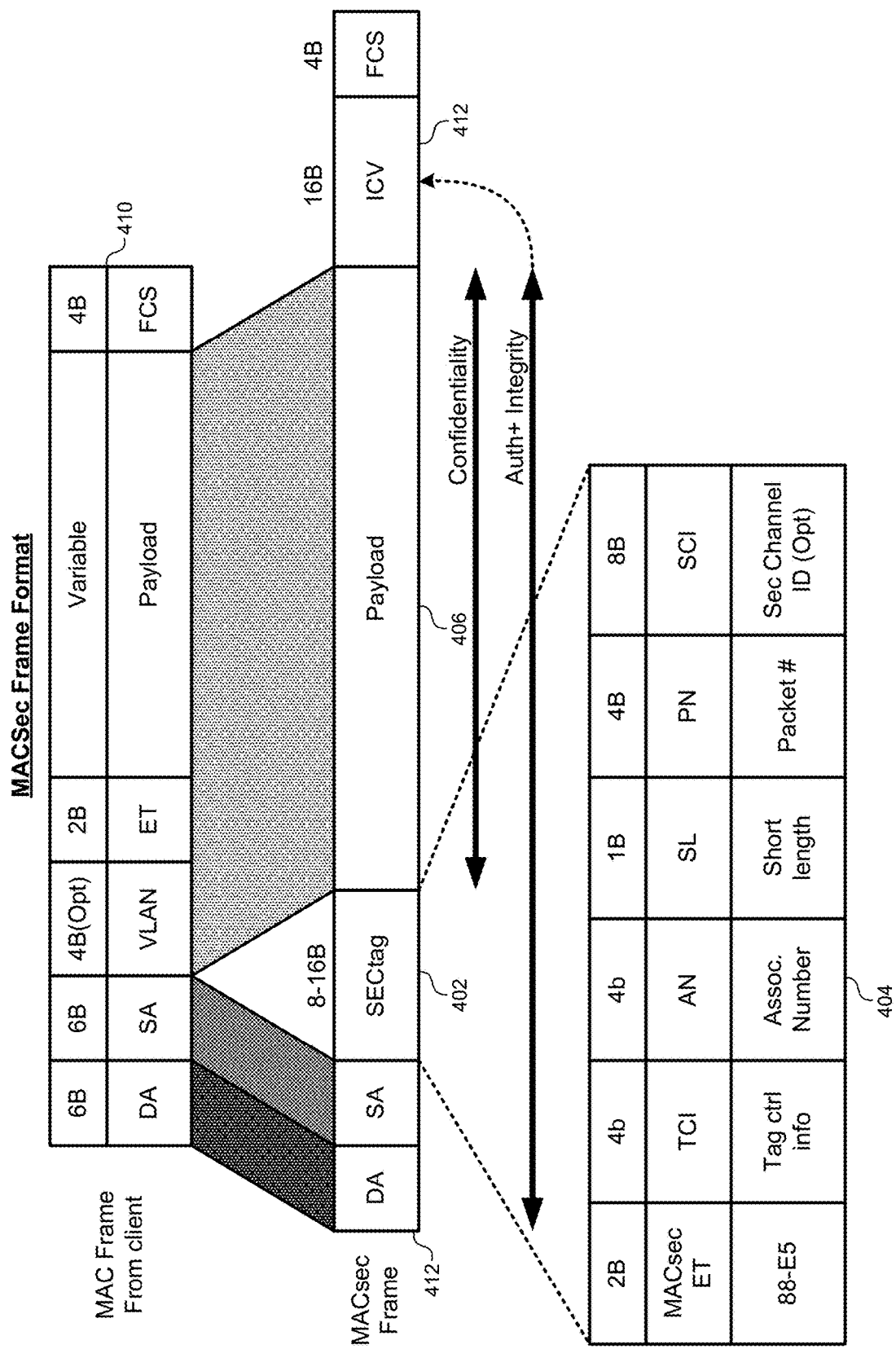
FIG. 4 illustrates a diagram of an example encrypted frame format, according to some embodiments.

FIG. 4 illustrates a diagram of an example encrypted frame format, according to some embodiments. An unencrypted frame 410 from the client can have the payload and certain fields (e.g., VLAN, ET) encrypted as part of an encrypted payload 406 in the encrypted frame 412. Other fields in the unencrypted frame 410 (e.g., DA, SA, FCS) can be appended to the encrypted payload 406. Additionally, the encryption hardware 118a can append a security tag 402 to the encrypted frame 412. The security tag 402 may include one or more fields that describe characteristics of the encrypted payload 406. Although the security tag 402 (SECtag) illustrated in FIG. 4 is specific to the MACsec protocol, other protocols may use similar or different fields in a similar manner. In some embodiments, the association number (AN) 404 may be used to specify a system (e.g., client system vs. test system) from which an encrypted frame is being derived, such as the client packets 208 or the test packets 206. Alternatively, some embodiments may use the AN number strictly to specify security parameters, and then rely on a classification lookup to classify the packets as test packets or client packets.

Turning back to FIG. 3, the encryption hardware 118b can extract the AN field from the security tag 402 of the encrypted frame and use the AN field to look up the corresponding security parameters in an AN lookup table 302. The AN lookup table 302 may include similar security parameters as the security lookup table 212, except the AN lookup table 302 may be keyed using the AN value instead of a packet type. In some embodiments, the security lookup table 212 and the AN lookup table 302 may be combined into a single table where the AN value and the packet type are interchangeable or can be readily derived from each other. After retrieving the corresponding security parameters, the encryption hardware 118b can then decrypt the encrypted frame and pass the unencrypted frame to a packet classification stage 301.

In a process similar to that described in FIG. 2, the packet classification stage 301 can identify a packet type based on one or more fields in the packet header, packet body, or other portion of the packet, such as a port number, a VLAN group, and so forth. In some embodiments, the packet classification stage 301 need not use the classification table 210. Because the encryption hardware 118b may have already determined a type of packet based on the AN field in the security tag, the receiving DCI transport system 104b may use that information to separate the decrypted test packets from the decrypted client packets. Thus, some embodiments may eliminate the classification table 210 and/or the packet classification stage 301 from the receiving data path. In any case, the encryption hardware 118b and/or the packet classification stage 301 can pass the decrypted client packets 306 as the client data 112b in the normal data path. Therefore, regardless of whether test packets are being encrypted/decrypted within the data path, the process may be transparent to the client data endpoints 112a, 112b.

The decrypted test packets 304 can be passed to a CPU 206b that is configured to determine whether the encryption of the test packets 206 was successful. In some embodiments, the CPU 206b may be the same as the CPU 206a, or may at least be a part of the same test system. Alternatively, the CPUs 206a, 206b may each be located on their respective DCI transport system hardware, but may be configured to share information such that the CPU 206b is able access to an expected result of the encryption process. In some embodiments, the CPU 206b may compare the contents of the decrypted test packets 304 to the contents of the original test packets 206 to ensure that the encryption/decryption process maintained the integrity of the test packets. Turning back to FIG. 4, some embodiments may also may use the ICV field 416 of the encrypted frame 412 to verify that the contents of the encrypted frame have not been tampered with.

Figure 5A:
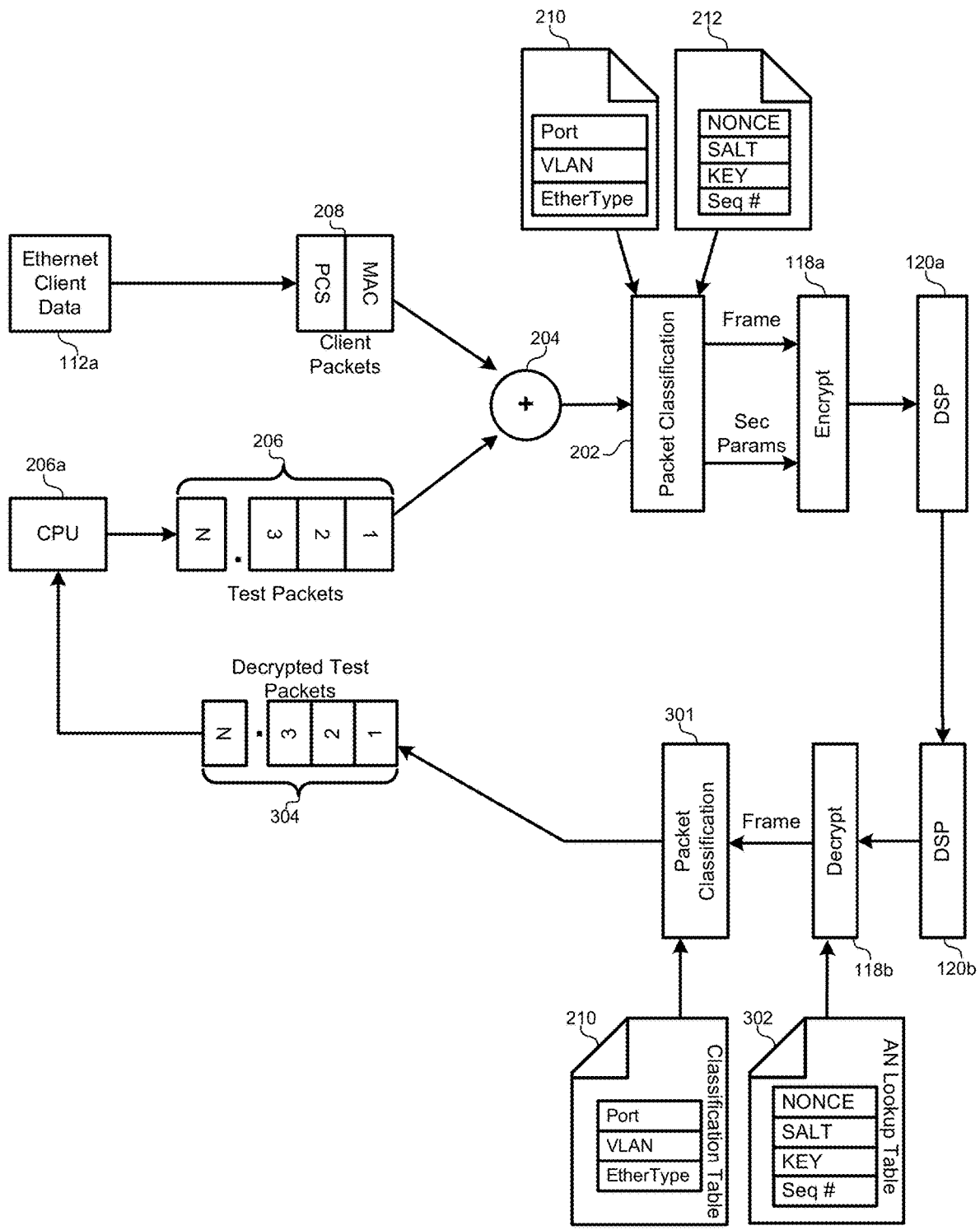
FIG. 5A illustrates a data path for a single DCI transport system performing encryption verification, according to some embodiments.

FIG. 5A illustrates a data path for a single DCI transport system performing encryption verification, according to some embodiments. Here, a single in-service DCI transport system may be used to verify the operation of the encryption hardware. In the top portion of FIG. 5A, the data path proceeds as illustrated and described in relation to FIG. 2. However, instead of, or in addition to passing the encrypted frames through the cloud transport network, the output of the DSP 120a can then be fed into the receiving DSP 120b of the same DCI transport system. The encryption hardware 118b can then decrypt the test packets and send them to the CPU 206a for verification. Note that the client packets 208 can be discarded by the packet classification stage 301 since they are also being transmitted to a receiving DCI transport system through the cloud transport network. This allows the CPU 206a to do a real-time self-test of the encryption verification without requiring the participation of any other DCI transport system in the network. Encrypted test packets received by other DCI transport systems may be discarded or verified again by the other DCI transport systems.

Figure 5B:
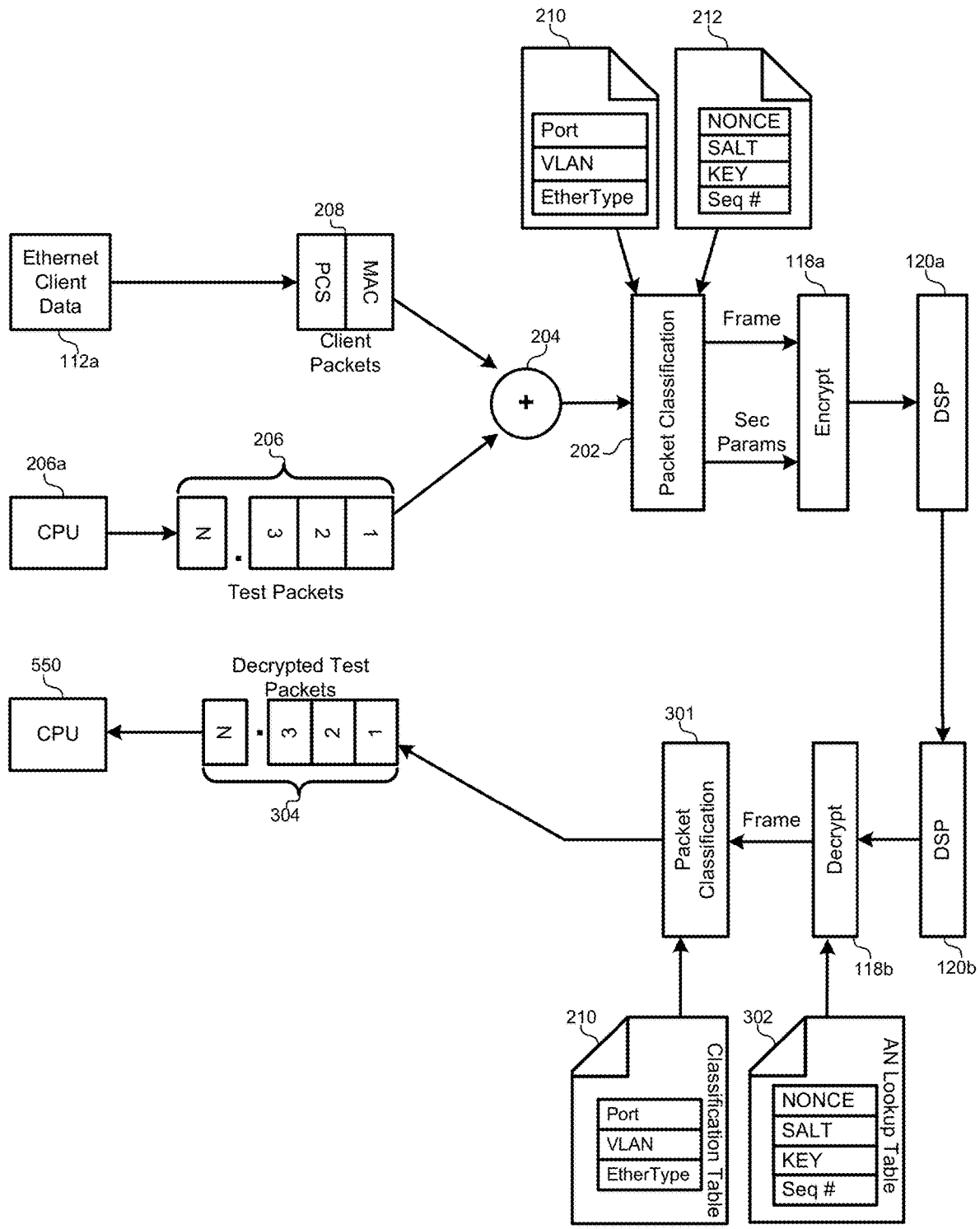
FIG. 5B illustrates a data path for a single DCI transport system with separate verification, according to some embodiments.

FIG. 5B illustrates a data path for a single DCI transport system with separate verification, according to some embodiments. As described above for FIG. 5A, a single in-service DCI transport system may be used to verify the operation of the encryption hardware. However, the same CPU 206a need not be used to both generate the test packets 206 and to verify the decrypted test packets 304. Instead, the decrypted test packets 304 may be sent to a to a different CPU 550 for verification. This allows any system, even an off-line systems, to be involved in monitoring the test packets. For example, the decrypted test packets 304 may be passed to a customer system or a different system.

In some embodiments, the encrypted packets may be passed from the DSP 120a through the rest of the cloud transport network to a second DCI transport system. The second DCI transport system may receive the encrypted packets, decrypt the client data 112a, and discard the encrypted test packets 304 as described above. At the same time, the encrypted packets from the DSP 120a may also be routed to the receiving DSP 120b on the same DCI transport system such that the encrypted test packets can be decrypted and verified by the CPU 550. This allows the test packets 206 to be injected into the data stream and decrypted/verified at the same DCI transport system while still allowing the client data 112a to be passed through the cloud transport network to another DCI transport system.

Figure 6:
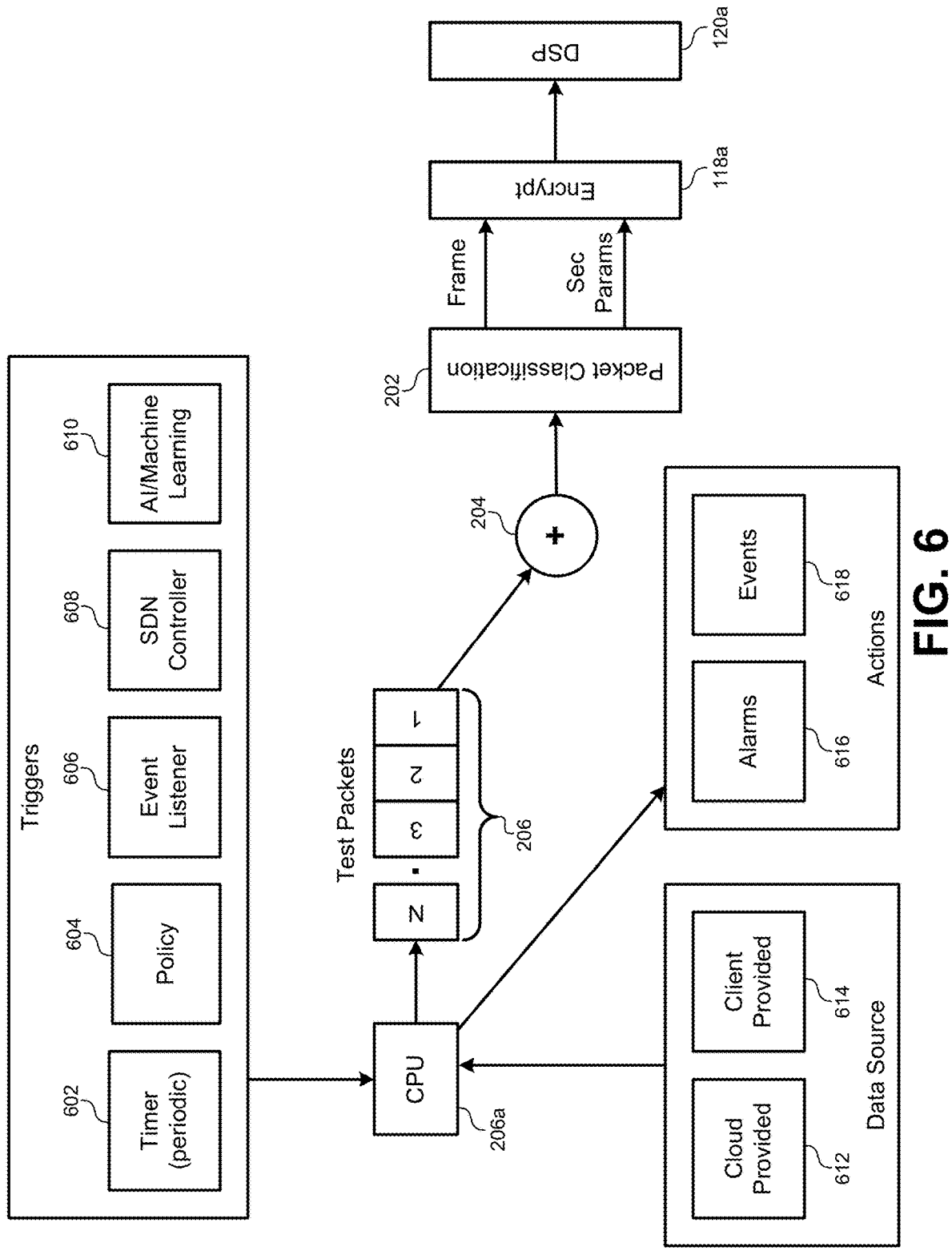
FIG. 6 illustrates various triggers, data sources, and events that may be used or generated by the CPU to initiate an encryption verification session, according to some embodiments.

FIG. 6 illustrates various triggers, data sources, and events that may be used or generated by the CPU 206a to initiate an encryption verification session, according to some embodiments. The test procedure can receive test packets from a variety of different data sources. In some embodiments, the cloud platform or the DCI transport system itself may generate or provide test data for the procedure. The cloud-provided data 612 can be predetermined or may be generated randomly at test time. In some embodiments, the test procedure may also allow for the use of client-provided test data 614. For example, a client may provide test data that is similar to the actual client packets to ensure that the encryption of the client packets is correct. Some embodiments may use other data sources, such as commercial data sets or known test vector collections.

Additionally, various triggers may be received to initiate an encryption verification session. In some embodiments, a timer 602 may be used to provide periodic injections of test data. For example, the system may initiate a test session once per hour, once per day, once per week, and so forth. The timer value may be dynamically adjusted based on network events and/or client preferences. The timer value may also change according to the lifecycle of the encryption hardware such that the encryption is verified more often on systems that are at the beginning/end of their lifecycle, and tested less on systems during the middle portion of their lifecycle.

Some embodiments may additionally or alternatively use a policy engine 604 to determine when encryption verification should take place. Policies may be designed by an administrator and/or by a client to specify when encryption verification should be triggered. For example, a client-specific policy may specify that encryption verification should take place during low-client-traffic time intervals. A policy may also specify time windows during which verification is allowed. The policy engine 604 may evaluate policies that are reactive to network events, such as packet verification errors, dropped packets, and so forth. Policies may be designed using any business logic that can be evaluated by the policy engine 604. Generically, a policy framework may be included where one or more events satisfying particular conditions may be used to trigger one or more actions. One of those actions may be specified as an encryption verification event.

Some embodiments may use one or more event listeners 606 to be reactive to network events or other external stimuli for determining when verification should take place. For example, some embodiments may begin testing when a threshold number of ICV errors have been detected. In another example, encryption self-testing may be invoked after detecting a threshold number of invalid login attempts or a variation in the optical received power of the DCI transport system. These and other events may indicate that a security breach is being attempted, and the veracity of the encryption system may therefore be of particular importance at that time.

Some embodiments may receive inputs from an SDN controller 608 or other centralized entity or network element to initiate the encryption verification. For example, some triggers may require network-level observations that may be readily available to the SDN controller 608. This may include network traffic events or other events that occur in the cloud transport network or other network. The SDN controller 608 may also encompass other entities, such as an analytics data pool, which may be analyzed periodically to generate triggers that begin the encryption verification.

Some embodiments may also use an artificial intelligence or machine learning module 610 to generate encryption verification triggers. Specifically, this module 610 can receive indications of any local or network-level events, as well as indications of abnormalities in the data stream or encryption. The module 610 can then begin classifying input events to determine which events are likely to require encryption verification. The module can then monitor real-time events to preemptively recognize situations where encryption verification may be beneficial or required. The module can then generate a trigger to the CPU 206a to initiate an encryption verification session as needed.

After a verification session is complete, the outcome of the verification session can be used to trigger one or more actions. For example, a failed verification event may generate one or more alarms 116 to notify other network elements and/or users of the results of the encryption self-tests. These can be generated for both successful and unsuccessful verifications. Additionally, one or more events 618 can be generated to take particular actions in the network based on passed/failed verification sessions. For example, encryption pass/fail information can generate Syslog messages, SNMP traps, NETCONF notifications, and so forth. Self-test results can also be streamed via telemetry-based protocols such as GRPC, Thrift, or Web Sockets. In some embodiments, the events 618 may generate a key-rotation event based on verification results. For example, if a threshold number of verification sessions generate unsatisfactory results, encryption keys may be rotated or retired between the DCI transport systems, and a retest may be initiated.

Figure 7A:
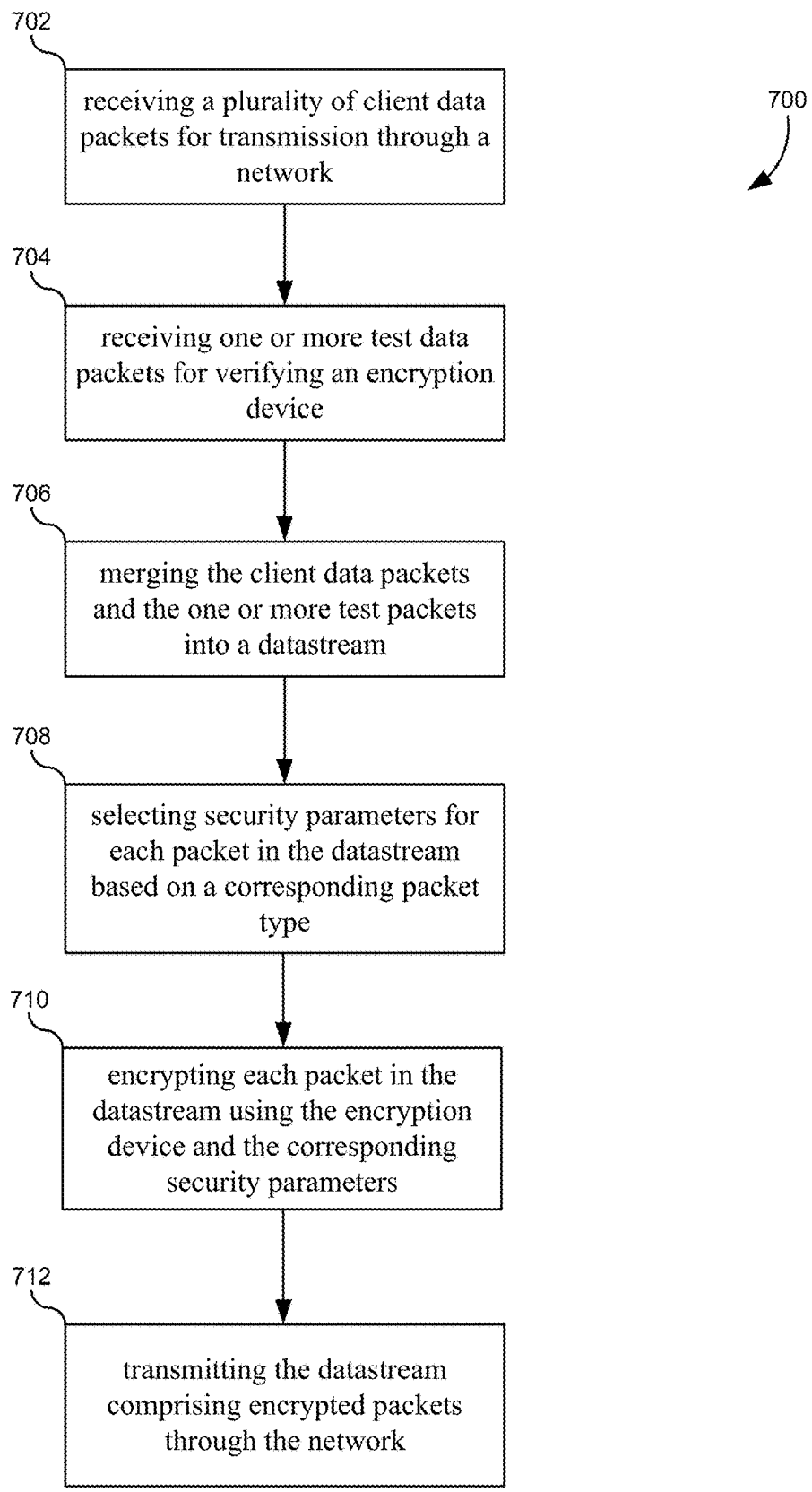
FIG. 7A illustrates a flowchart of a method for executing in-session encryption verification, according to some embodiments.

FIG. 7A illustrates a flowchart 700 of a method for executing in-session encryption verification, according to some embodiments. The method may include receiving a plurality of client data packets for transmission through a network (702). As described above, the client data packets may be received from any data source, including a client data center. The client data packets may be received as individual data packets for transmission across a network connection. The client data packets may be received by a general-purpose processor. The client data packets may alternatively or additionally be received by a dedicated ASIC. The ASIC may include a packet classification stage, one or more stored classification tables, a security lookup table, encryption hardware, a DSP, and/or other hardware elements that may be part of a DCI transport system as described above in relation to FIG. 2. It should be emphasized that this method may be carried out at run time as the DCI transport system is encrypting, decrypting, and/or transmitting data packets from clients. This may be distinguished from any other off-line encryption testing process or system.

The method may also include receiving one or more test data packets for verifying an encryption device (704). The test data packets may be received from a separate data source from a data source providing the client data packets, such as a CPU, a microcontroller, a network connection to a remote computing system, a server, and/or any other data source. In some embodiments, the test data packets may be numbered with individual sequence numbers that are separate and distinct from sequence numbers provided for the client data packets.

The method may additionally include merging the client data packets and the one or more test packets into a data stream (706). The test data packets may be injected into the data stream with the client data packets in any combination and without limitation. The data within the individual client data packets may be transmitted such that the data are never mixed with data from the individual test data packets. Various methods may be used to determine when the test data packets are merged into the data stream with the client data packets. Some embodiments may use a weighted round-robin algorithm to insert test data packets into the data stream. Some embodiments may inject test packets when the traffic of the client data packets falls below a threshold. Some embodiments may use a fixed or variable ratio of client data packets to test data packets as described above. These methods may govern how much of a datastream is comprised of client data packets compared to test data packets over any time interval.

The method may further include selecting security parameters for each packet in the data stream based on a corresponding packet type (708). As described above, a packet classification stage may classify each data packet in the data stream using predetermined security parameters corresponding to the corresponding packet type. For example, the system may encrypt client data packets according to a first set of security parameters, and may encrypt test data packets according to a second set of security parameters. In some embodiments, a classification table may be indexed using information read from each of the packets in the datastream to classify those packets as client data packets, test data packets, etc. The packet classification stage may read a field from a packet header, may use a packet sequence number, and/or may examine a packet payload to determine a packet type using the classification table. Many different packet classifications may be available including test data packets and/or client data packets for many different clients.

The method may also include encrypting each packet in the data stream using the the corresponding security parameters (710). Encryption hardware may retrieve security parameters from a security lookup table. The security parameters may include any type of security parameter, such as a selection of a particular encryption algorithm, a NONCE value, a SALT value, an encryption KEY value, a sequence number, a seed value, and/or any other values that may be used to select and/or execute an encryption algorithm implemented in hardware and/or software. Each packet may be encrypted using the corresponding security parameters, and a subsequent packet may be encrypted using different security parameters based on the determined type. In some embodiments, a field in the encrypted data packets may be used to specify a type for each data packet. For example, using the MAC Sec security protocol, the AN field of the encrypted frame may be used to specify whether the encrypted frame was received from one of the client data packets or one of the test data packets.

The method may additionally include transmitting the data stream comprising encrypted packets through the network (712). In some embodiments, the encrypted data packets in the data stream may be passed through a DSP and sent through a cloud transport network to a separate DCI transport system that will receive and decrypt the packets as described above in FIG. 3. As described above in FIG. 5A and FIG. 5B, some embodiments may additionally or alternatively transmit the data stream back into a receiving interface of the same DCI transport system. For example, the encrypted data packets may be passed from the sending DSP to a receiving DSP of the same system. The receiving DSP may then handle the encrypted data packets in the datastream in the same way that they would be handled if received from a different DCI transport system. This may be used to perform a self-test using a single endpoint. Note that the encrypted data packets may also be sent to a different endpoint such that the client data packets arrive at their specified destination without interruption.

When including receiving hardware, the method may also include receiving the data stream comprising the encrypted packets. The method may additionally include identifying a type of each of the encrypted packets based on a field in a security tag of each of the encrypted packets. The method may further include selecting the security parameters for each of the encrypted packets based on the field in the security tag. The method may also include decrypting each of the encrypted packets and verifying whether the encryption device functioned properly.

It should be appreciated that the specific steps illustrated in FIG. 7A provide particular methods of executing encryption verification according to various embodiments. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7B:
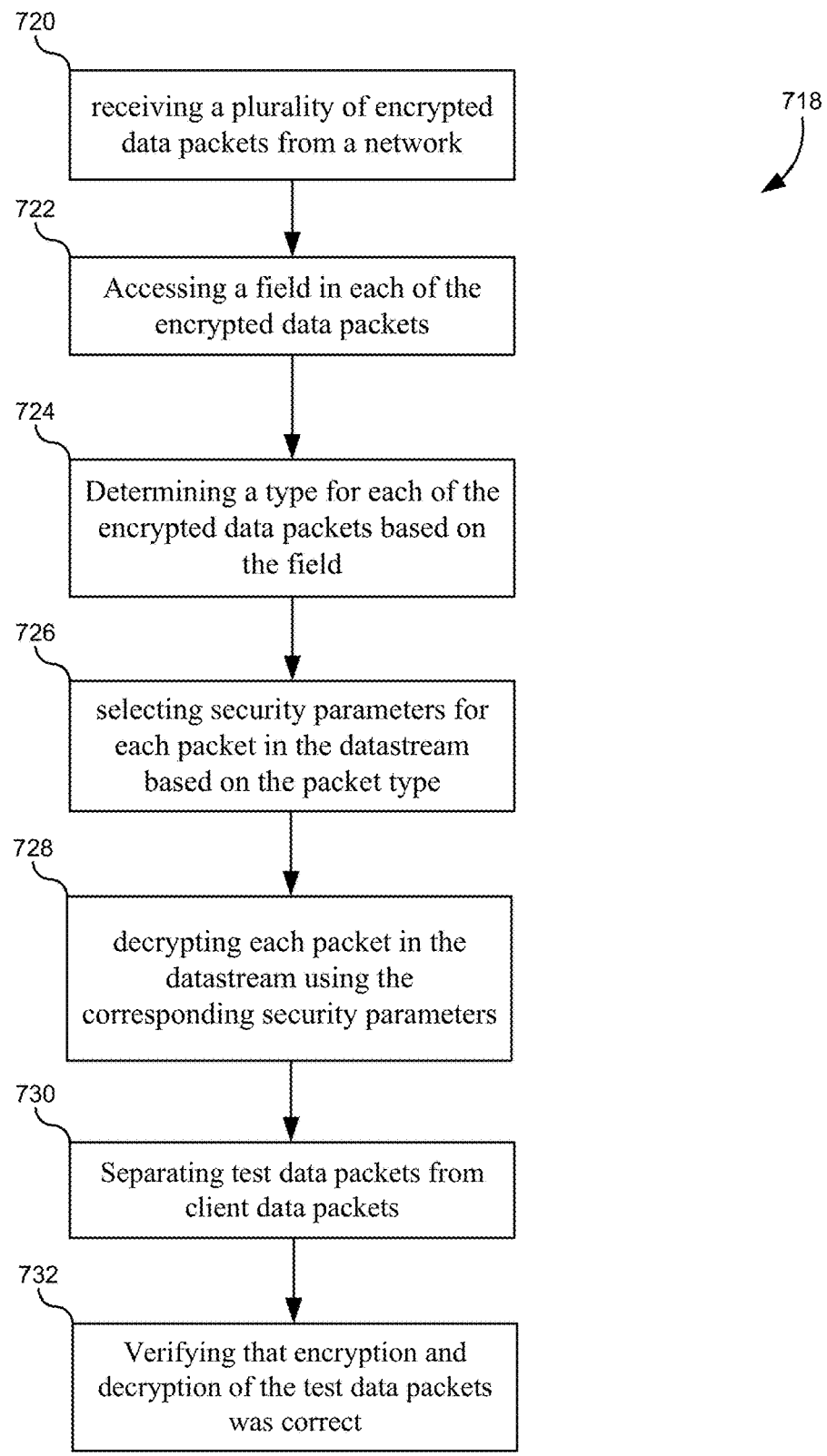
FIG. 7B illustrates a flowchart 718 of a method for executing in-session decryption verification, according to some embodiments.

FIG. 7B illustrates a flowchart 718 of a method for executing in-session decryption verification, according to some embodiments. The method of flowchart 718 may be carried out after the method of flowchart 700 in FIG. 7A. The method of flowchart 718 may also be executed by a DCI transport system that is the same as or separate from a DCI transport system that executed the method of flowchart 700. It should be emphasized that this method may be carried out at run time as the DCI transport system is encrypting, decrypting, and/or transmitting data packets from clients. This may be distinguished from any other off-line encryption testing process or system.

The method may include receiving a plurality of encrypted data packets from a network (720). The data packets may be received from a separate DCI transport system and may have been encrypted before transmission. The encrypted data packets may include both encrypted client data packets and encrypted test data packets as described above. In some embodiments, the plurality of encrypted data packets may be received from a transmitting DSP on the same DCI transport system.

The method may also include accessing a field in each of the encrypted data packets (722). The field may be part of a header or wrapper that is applied as part of a security protocol around an encrypted frame. For example, using the MACsec security protocol, a field such as the AN field may be used to specify a packet type. The method may further include determining a type for each of the encrypted data packets based on the field (724). For example, a packet classification stage may use the field to index an entry in a classification table to return a packet type. The packet type may distinguish between various packet types, such as test packet types and/or packet types from various different clients.

The method may additionally include selecting security parameters for each encrypted packet in the datastream based on the packet type (726). For example, a decryption stage may access a lookup table that retrieves security parameters based on the packet type. The security parameters may include any of the parameters described above, including a selection of a decryption algorithm, a NONCE value, a SALT value, a KEY value, a sequence number, and/or any other type of security parameter.

The method may further include decrypting each packet in the data stream using the corresponding security parameters (730). Because a type for each packet is determined individually, and security parameters are retrieved for each packet individually, the decryption stage may decrypt each packet in the data stream using its own corresponding security parameters. This allows test packets to be interleaved in the datastream amongst the client data packets in any combination.

The method may also include separating test data packets from client data packets (730). This separation may be executed by using the AN value or other value from the encrypted data packets used to classify the packet type for the security parameters. Alternatively or additionally, this separation may be executed by examining a header of the decrypted packet as described above in flowchart 700. For example, a header may specify a label or sequence number that indicates that a particular packet is a test packet rather than a client data packet. The different types of data packets may then be sent in different streams to different processors. For example, client data packets may be sent to a client device or client data center to complete the transmission. Test data packets may be sent to a CPU, server, or network connection such that they can be verified as part of a test procedure.

The method may additionally include verifying that encryption and decryption of the test data packets was correct (732). For example, a data payload from the decrypted test data packets may be compared to data payloads from the original test data packets to determine whether the encryption/decryption process caused any change in the data payload.

It should be appreciated that the specific steps illustrated in FIG. 7B provide particular methods of executing decryption verification according to various embodiments. Other sequences of steps may also be performed according to alternative embodiments. For example, alternative embodiments of the present invention may perform the steps outlined above in a different order. Moreover, the individual steps illustrated in FIG. 7B may include multiple sub-steps that may be performed in various sequences as appropriate to the individual step. Furthermore, additional steps may be added or removed depending on the particular applications. One of ordinary skill in the art would recognize many variations, modifications, and alternatives.

In addition to the ASIC implementations of FIGS. 2-5, each of the methods described herein may alternatively or additionally be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 8:
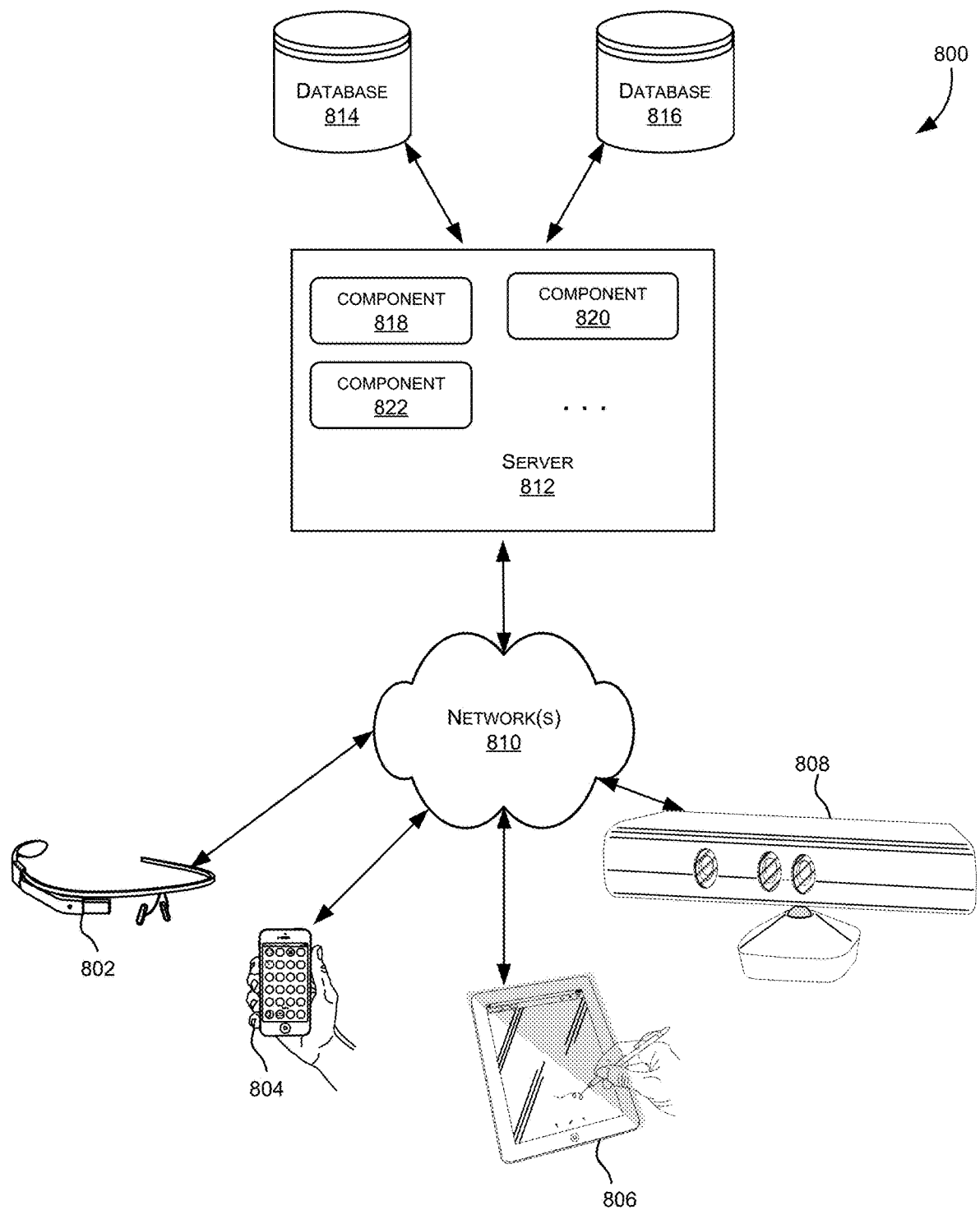
FIG. 8 illustrates a simplified block diagram of a distributed system for implementing some of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
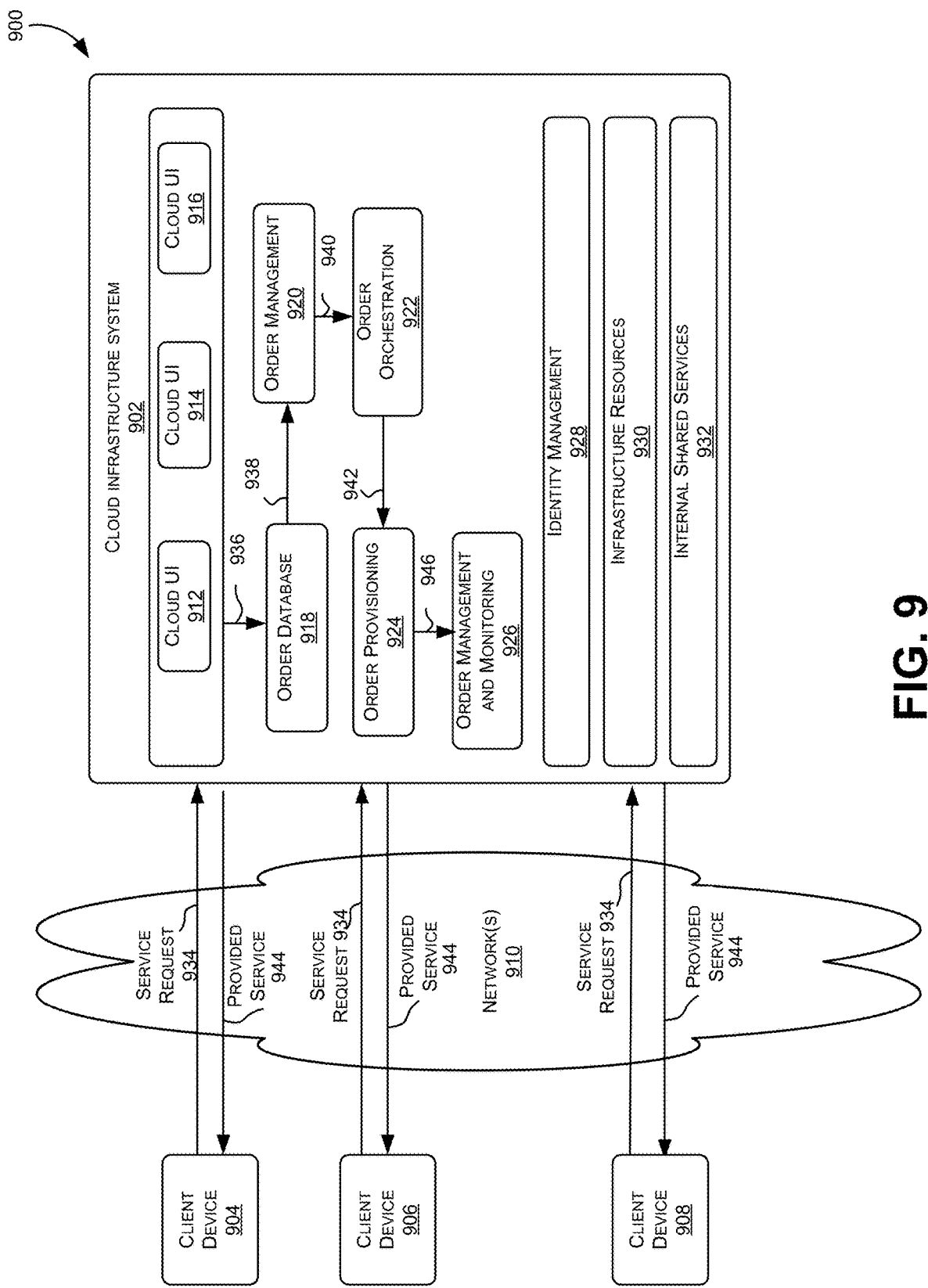
FIG. 9 illustrates a simplified block diagram of components of a system environment by which services provided by the components of an embodiment system may be offered as cloud services.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
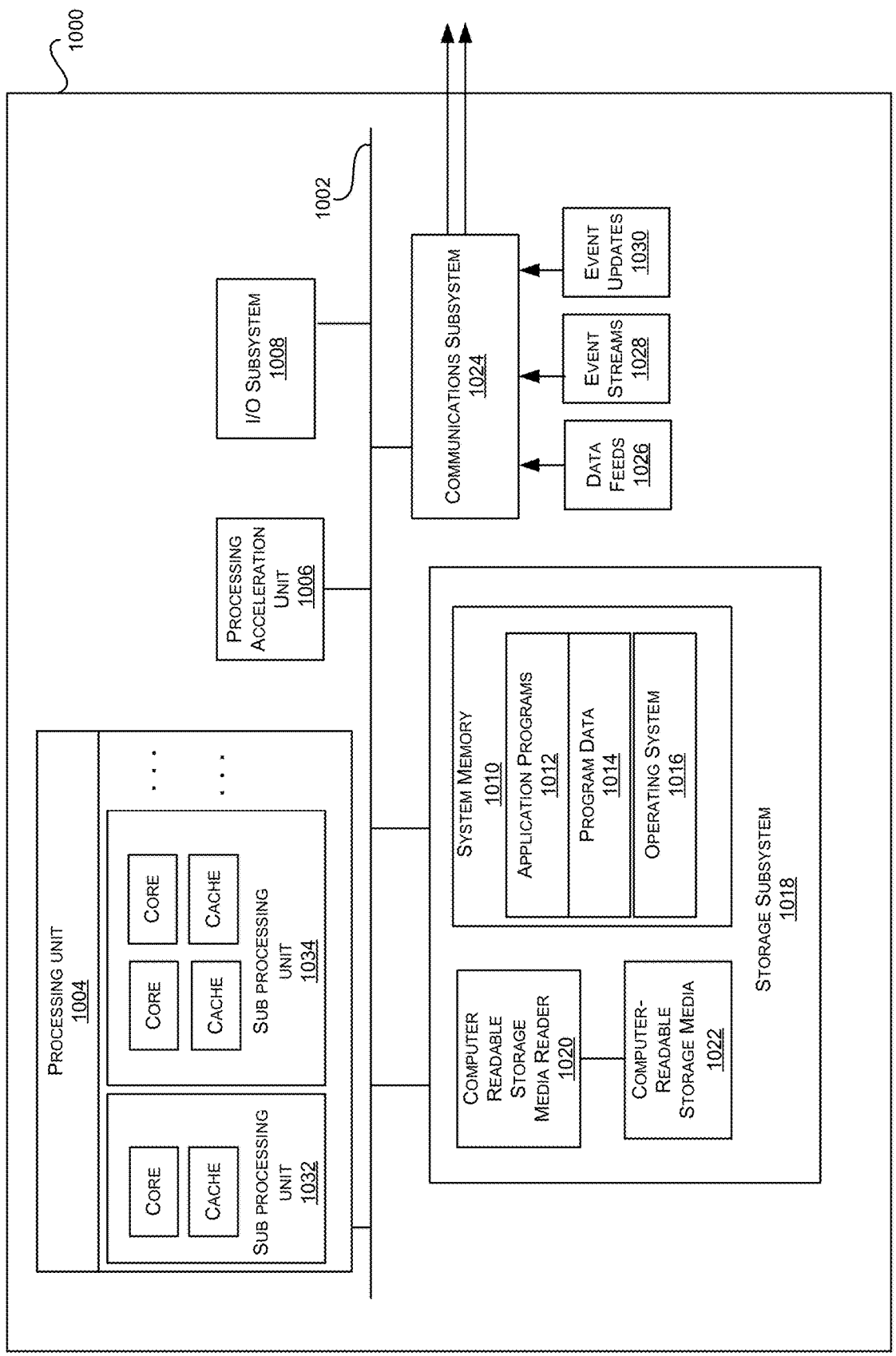
FIG. 10 illustrates an exemplary computer system, in which various embodiments may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of executing in-session encryption verification, the method comprising:
    receiving a plurality of client data packets for transmission through a network;
    receiving one or more test data packets for verifying an encryption device;
    merging the client data packets and the one or more test packets into a data stream;
    selecting security parameters for each packet in the data stream based on a corresponding packet type;
    encrypting each packet in the data stream using the encryption device and the corresponding security parameters;
    transmitting the data stream comprising encrypted packets through the network;
    receiving the data stream comprising the encrypted packets;
    identifying a type for each of the encrypted packets based on a field in a security tag of each of the encrypted packets;
    selecting the security parameters for each of the encrypted packets based on the field;
    decrypting each of the encrypted packets; and
    verifying whether the encryption device functioned properly.

2. The method of claim 1, further comprising providing, to a user, an indication of whether the encryption device functioned properly.

3. The method of claim 1, further comprising:
    receiving a trigger signal to initiate the encryption verification.

4. The method of claim 3, wherein the trigger signal is generated by a policy engine.

5. The method of claim 3, wherein the trigger signal is generated by a network controller.

6. The method of claim 3, wherein the trigger signal is generated by a machine learning engine.

7. The method of claim 3, wherein the trigger signal is generated periodically automatically.

8. The method of claim 1, wherein the plurality of client data packets are sequenced differently than the one or more test data packets.

9. The method of claim 1, further comprising determining the packet type using information in a header of the packet and a classification table.

10. The method of claim 1, further comprising selecting the security parameters from a lookup table.

11. A system comprising:
    one or more inputs configured to
        receive a plurality of client data packets;
        receive one or more test data packets; and
        merge the client data packets and the one or more test packets into a data stream;
    a packet classification stage configured to select security parameters for each packet in the data stream based on a corresponding packet type;
    an encryption device configured to encrypt each packet in the data stream using the encryption device and the corresponding security parameters; and
    an output configured to transmit the data stream comprising encrypted packets through a network; and
    a control channel configured to securely transmit encryption keys between Data Center Interconnect (DCI) transport systems in a cloud transport network, wherein the control channel is separate and distinct from a channel through which the encrypted packets are transmitted through the network.

12. The system of claim 11, wherein the output comprises a Digital Signal Processor(DSP) and a Peripheral Interface Controller (PIC).

13. The system of claim 11, wherein the system comprises a Data Center Interconnect (DCI) transport system.

14. The system of claim 11, further comprising:
    second one or more inputs configured to receive the data stream comprising the encrypted packets;
    a second packet classification stage configured to:
        identify a type for each of the encrypted packets based on a field in a security tag of each of the encrypted packets; and
        select the security parameters for each of the encrypted packets based on the field;
    a second encryption device configured to decrypt each of the encrypted packets; and
    a processor configured to verify whether the encryption device functioned properly.

15. The system of claim 14, wherein the encryption device and the second encryption device are part of a same Data Center Interconnect (DCI) transport system.

16. The system of claim 11, wherein identifying a type for each of the encrypted packets comprises accessing an Association Number (AN) field in a Media Access Control Security (MACsec) frame around an encrypted payload.

17. A non-transitory, computer-readable medium comprising instructions that, when executed by one or more processors, cause the one or more processors to perform operations comprising:
  receiving a plurality of client data packets for transmission through a network;
  receiving one or more test data packets for verifying an encryption device;
  merging the client data packets and the one or more test packets into a data stream;
  selecting security parameters for each packet in the data stream based on a corresponding packet type;
  encrypting each packet in the data stream using the encryption device and the corresponding security parameters;
  transmitting the data stream comprising encrypted packets through the network;
  receiving the data stream comprising the encrypted packets;
  identifying a type for each of the encrypted packets based on a field in a security tag of each of the encrypted packets;
  selecting the security parameters for each of the encrypted packets based on the field;
  decrypting each of the encrypted packets; and
  verifying whether the encryption device functioned properly.

18. The non-transitory, computer-readable medium of claim 17, wherein the operations further comprise:
  securely transmitting encryption keys between Data Center Interconnect (DCI) transport systems in a cloud transport network on a control channel, wherein the control channel is separate and distinct from a channel through which the encrypted packets are transmitted through the network.

19. The non-transitory, computer-readable medium of claim 17, wherein the operations further comprise determining the packet type using information in a header of the packet and a classification table.

20. The non-transitory, computer-readable medium of claim 17, wherein the operations further comprise providing, to a user, an indication of whether the encryption device functioned properly.

* * * * *

UNITED STATES PATENT AND TRADEMARK OFFICE
CERTIFICATE OF CORRECTION

PATENT NO. : 11,425,147 B2
APPLICATION NO. : 16/796733
DATED : August 23, 2022
INVENTOR(S) : Raj et al.

It is certified that error appears in the above-identified patent and that said Letters Patent is hereby corrected as shown below:

In the Drawings

On sheet 1 of 12, in FIG. 1, and on the title page, the illustrative figure, under Reference Numeral 114, Line 1, delete "Establshment" and insert -- Establishment --, therefor.

In the Specification

In Column 1, Line 14, delete "infrastrutures" and insert -- infrastructures --, therefor.

In Column 7, Line 67, delete "may also may" and insert -- may also --, therefor.

In Column 11, Line 11, delete "the the" and insert -- the --, therefor.

In Column 23, Line 30, delete "evolution)," and insert -- evolution)), --, therefor.

Signed and Sealed this
Fourteenth Day of February, 2023

Katherine Kelly Vidal
*Director of the United States Patent and Trademark Office*